United States Patent
Ho et al.

(10) Patent No.: US 10,245,782 B2
(45) Date of Patent: Apr. 2, 2019

(54) METHOD FOR PRINTING A MODEL FOR 3D PRINTER

(71) Applicants: XYZPRINTING, INC., New Taipei (TW); KINPO ELECTRONICS, INC., New Taipei (TW)

(72) Inventors: Kwan Ho, New Taipei (TW); Yu-Chuan Chang, New Taipei (TW); Hsin-Ta Hsieh, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/832,044

(22) Filed: Dec. 5, 2017

(65) Prior Publication Data

US 2018/0290382 A1 Oct. 11, 2018

(30) Foreign Application Priority Data

Apr. 11, 2017 (TW) .............................. 106112017 A

(51) Int. Cl.
*B33Y 10/00* (2015.01)
*B33Y 30/00* (2015.01)
(Continued)

(52) U.S. Cl.
CPC .......... *B29C 64/194* (2017.08); *B29C 64/106* (2017.08); *B29C 64/386* (2017.08);
(Continued)

(58) Field of Classification Search
CPC ...... G05B 19/4099; G05B 2219/49007; G05B 2219/37366; B29C 64/112; B29C 64/00; B33Y 10/00
See application file for complete search history.

(56) References Cited

U.S. PATENT DOCUMENTS

| | | | | |
|---|---|---|---|---|
| 5,980,813 | A | * 11/1999 | Narang | B29C 64/40 264/308 |
| 6,799,959 | B1 | * 10/2004 | Tochimoto | B29C 41/12 425/130 |

(Continued)

OTHER PUBLICATIONS

Park J. C. et al.: "A Study on Fabrication of Internally Colored Shape in Stereolithography Parts using Molten Ink Deposition Process", Journal of the Korean Society for Precision Engineering, vol. 27, No. 6, Jun. 1, 2010, pp. 98-104, XP055488119, Retrieved from the Internet: URL:http://www. koreascience.or.kr/journal/AboutJournal.jsp?kojic=JMGHBV&year_GB=2010 [retrieved on Aug. 26, 2018] *the whole document*.

(Continued)

*Primary Examiner* — John Zimmermann
(74) *Attorney, Agent, or Firm* — Chun-Ming Shih; HDLS IPR Services

(57) ABSTRACT

A method for printing a model for a 3D printer includes: perform a slicing process on an outer-frame object for generating multiple slicing-route files of multiple printing layers; perform the slicing process on a modeling object for generating multiple inkjet graphic files of the multiple printing layers; print a slicing object of one printing layer according to corresponding one of the slicing-route files; perform a filling process to the inside of the printed slicing object; perform a coloring process on the inside of the printed slicing object according to one of the inkjet graphic files corresponding to the same printing layer; and re-execute the above printing steps until all the printing layers are printed. The inside of the 3D model is colored via the inkjet graphic files generated after processing on the modeling object generating the visual effect that the modeling object is accommodated within the 3D model.

13 Claims, 8 Drawing Sheets

(51) Int. Cl.
*B29C 64/194* (2017.01)
*H04N 1/54* (2006.01)
*B33Y 80/00* (2015.01)
*B29C 64/106* (2017.01)
*B29C 64/386* (2017.01)

(52) U.S. Cl.
CPC ............... *B33Y 10/00* (2014.12); *B33Y 30/00* (2014.12); *B33Y 80/00* (2014.12); *H04N 1/54* (2013.01)

(56) References Cited

U.S. PATENT DOCUMENTS

| | | | |
|---|---|---|---|
| 7,556,490 B2 * | 7/2009 | Wicker | B33Y 30/00 264/113 |
| 2002/0167101 A1 | 11/2002 | Tochimoto et al. | |
| 2015/0172630 A1 * | 6/2015 | Hsieh | G01B 21/047 348/50 |
| 2015/0246484 A1 * | 9/2015 | Hirschberg | B01F 5/0619 366/336 |
| 2015/0343704 A1 * | 12/2015 | Stahl | B29C 64/112 264/401 |
| 2016/0059485 A1 * | 3/2016 | Ding | B33Y 10/00 264/401 |
| 2016/0096324 A1 * | 4/2016 | Giller | B29C 64/135 264/401 |
| 2016/0221266 A1 | 8/2016 | Cronin | |
| 2016/0297150 A1 * | 10/2016 | Ueda | G05B 19/4099 |

OTHER PUBLICATIONS

European Search Report issued by European Patent Office dated Jul. 4, 2018.

* cited by examiner

METHOD FOR PRINTING A MODEL FOR 3D PRINTER

BACKGROUND OF THE INVENTION

Field of the Invention

The present invention relates to 3D printing methods, in particular relates to a 3D printing method for printing a model.

Description of Prior Art

As the 3D printing technology has become increasingly sophisticated and 3D printers now are designed with compact dimensions and sold at lower retail prices, 3D printers rapidly become popular. Also, manufacturers developed 3D printers for printing color 3D models so as to increase the market acceptance of 3D printed models.

Generally speaking, a 3D printer retrieves printing data from a computer upon the computer performs a slicing process on an imported 3D object. The 3D printer controls nozzles to execute printing operations according to the printing data in order to eject molding materials and inks on the correct locations. Accordingly, the 3D printer generates a physical 3D model having exactly same shape and color with the imported 3D object after completing the printing operations.

However, it is a pity that the 3D printers in the market only print physical 3D models having exactly same shape and color with the imported 3D object and are unable to adjust the printing data of the 3D objects in order to generate the physical 3D model with special effect.

SUMMARY OF THE INVENTION

It is an objective of the present invention to provide a method for printing a model used for a 3D printer, which prints a physical 3D model with special effects, for example with an internal engraving effect.

In an embodiment according to the present invention, a printing method comprises the following steps: perform a slicing process on an outer-frame object for generating multiple slicing-route files of multiple printing layers; perform the slicing process on a modeling object for generating multiple inkjet graphic files of the multiple printing layers; print a slicing object of one printing layer according to corresponding one of the slicing-route files; perform a filling process to the inside of the printed slicing object; perform a coloring process on the inside of the printed slicing object according to one of the inkjet graphic files corresponding to the same printing layer; and re-execute the above printing operations until all printing layers are printed.

Compare with the prior are 3D printing methods, the method according to the present invention performs a slicing process on a first object to obtain a slicing-route file for printing a 3D model and performs a slicing process on a second object to obtain an inkjet graphic file for printing a 3D model. When the printing operations are executed, the 3D printer ejects molding materials according to the data of the first object and ejects inks according to the data of the second object, whereby the completed 3D model is printed with an internal engraving effect.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
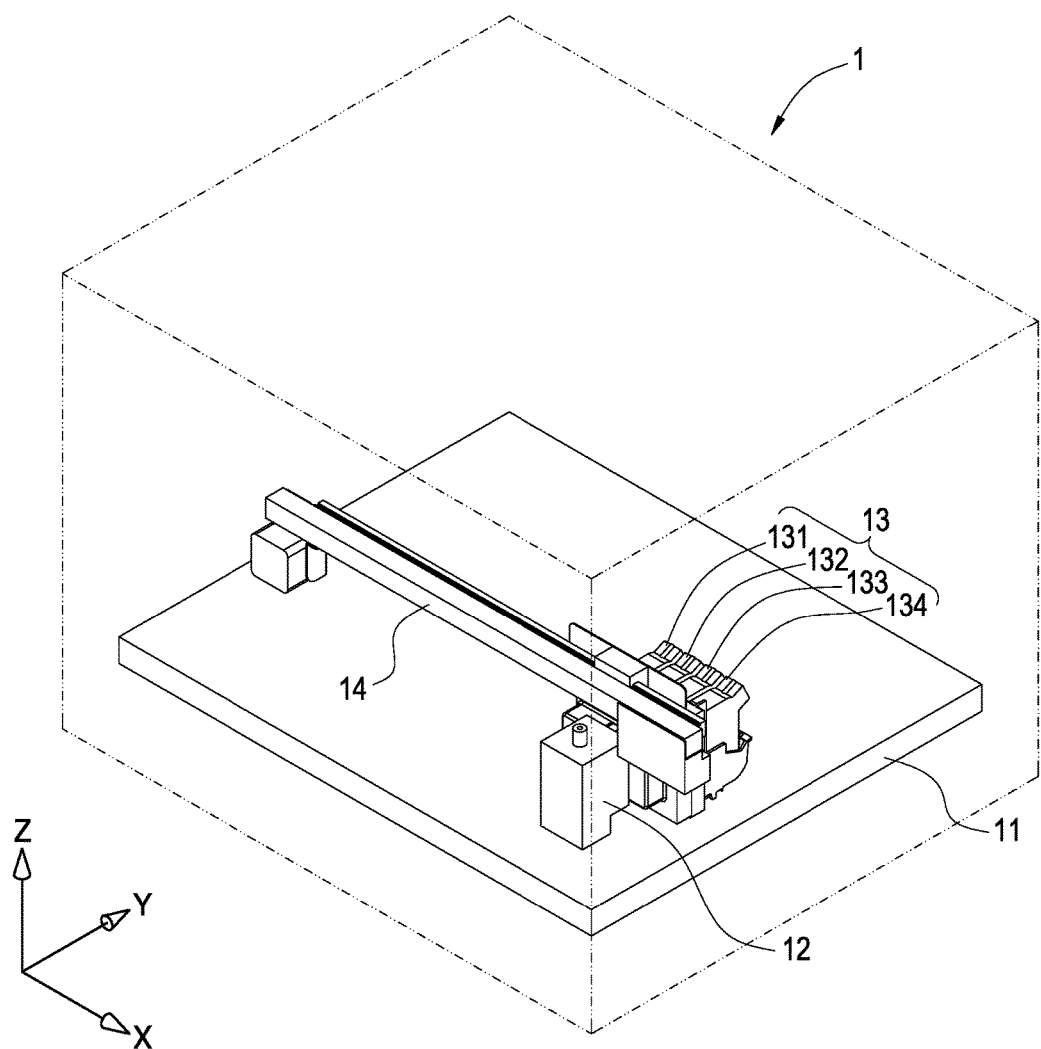
FIG. 1 is a 3D printer schematic diagram according to the a first embodiment of the present invention.

FIG. 1 is a 3D printer schematic diagram according to a first embodiment of the present invention. An internal engraving model printing method for a 3D printer is disclosed in the present invention (referred as the printing method in the following) which is used for a 3D printer as shown in FIG. 1 (referred as the printer 1 in the following).

As shown in FIG. 1, the printer 1 has a printing platform 11, a 3D nozzle 12 and a 2D nozzle 13, wherein the 3D nozzle 12 is used for ejecting molding materials and the 2D nozzle is used for printing ejecting inks. In an embodiment, the 3D nozzle 12 and the 2D nozzle 13 are disposed separately on the printer 1. In another embodiment, the 3D nozzle 12 and the 2D nozzle 13 are integrated as a nozzle module, and configured on the printer 1.

In the embodiment in FIG. 1, the 3D nozzle 12 and the 2D nozzle 13 are disposed at a control rod 14 of the printer 1. Specifically, the 3D nozzle 12 and the 2D nozzle 13 are disposed on the control rod 14, and the printer 1 respectively moves the 3D nozzle 12 and 2D nozzle 13 by controlling the control rod 14. In other embodiments, the printer 1 is disposed with several control rods 14 and respectively moves the 3D nozzle 12 and 2D nozzle 13 with the different control rods 14.

Figure 2:
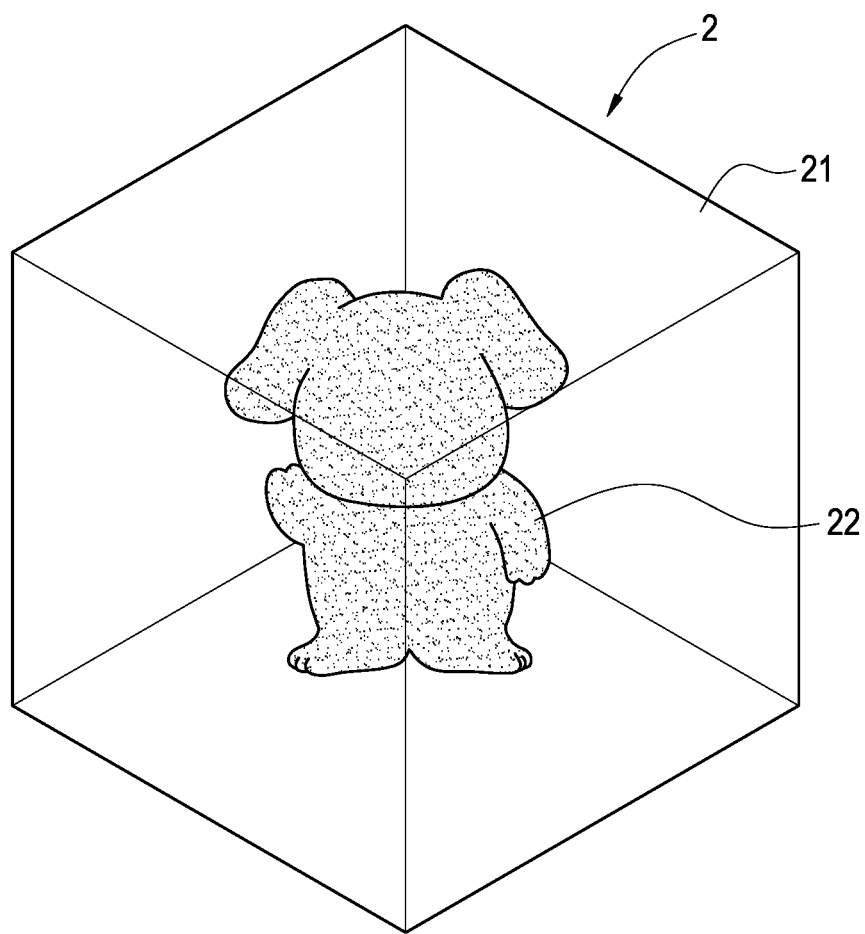
FIG. 2 is an internal engraving model schematic diagram according to the first embodiment of the present invention.

When the printer 1 performs the printing of a physical 3D model (as shown in FIG. 2), the printer 1 controls the 3D nozzle 12 to eject molding materials on the printing platform 11 in order to print the slicing objects corresponding to each printing layer of the 3D object by layers. In addition, the printer 1 controls the 2D nozzle 13 to eject inks on each printed slicing object in order to perform the coloring process on each slicing object. In other words, the printer 1 prints the structure part of the 3D model via the 3D nozzle 12, and print the color part of the 3D model via the 2D nozzle 13.

Specifically, the printer 1 controls the 3D nozzle 12 and the 2D nozzle 13 to move along X-axis or Y-axis directions (i.e. move horizontally) in order to print the slicing objects of a printing layer on the printing platform 11 and perform coloring on the slicing objects. In addition, the printer 1 also controls the 3D nozzle 12 and the 2D nozzle 13 to move along the Z-axis (i.e. move vertically) in order to adjust relative heights among the 3D nozzle 12/2D nozzle 13 and the printing platform 11 and further to print by layers as well as stacking the slicing objects of each printing layer.

In an embodiment, the 2D nozzle 13 is disposed with an ink cartridge with a monochrome ink. With application of the ink cartridge, the 2D nozzle 13 performs a monochrome coloring process on each slicing object. In another embodiment, the 2D nozzle 13 is disposed with several ink cartridges respectively having inks of different colors. In the embodiment shown in FIG. 1, the quantity of a plurality of ink cartridges are four including a first ink cartridge 131 with a cyan ink, a second ink cartridge 132 with a magenta ink, a third ink cartridge 133 with a yellow ink, and a fourth ink cartridge 134 with a black ink. With application of ink cartridges, the 2D nozzle 13 performs a full color coloring process on each slicing object.

In other embodiments, the printer 1 disposes the plurality of ink cartridges 131-134 at other locations of the printer 1, and the plurality of ink cartridges connect to the 2D nozzle 13 via several tubes (not shown in the diagrams).

FIG. 2 is an internal engraving model schematic diagram according to the first embodiment of the present invention. The printing method of the present invention is used for printing the internal engraving model 2 as shown in FIG. 2. The internal engraving model 2 has at least an outer-frame portion 21 and a color portion 22. The internal engraving used in the present invention refers to representing a model of a second solid object via performing an inkjet process or an etch process on a transparent or semi-transparent first solid object in order to generate a visual effect that the first solid object accommodates the second solid object. The "transparent or semi-transparent" above refers to that observers are able to see the model of the second solid object represented (for example colored by an inkjet process) through the first solid object. In other words, the first solid object is not required to be made by a high transmittance material, and the requirement of being "transparent or semi-transparent" is satisfied as long as the material is not completely opaque.

Specifically, the outer-frame portion 21 refers to all the parts which are comprised of the molding materials only in the internal engraving model 2 (i.e. the part of space occupied by the molding materials only and the color of the part of the space is the color of the molding material) and the color portion 22 refers to all the parts which are comprised of the molding materials combining with the inks in the internal engraving model 2 (i.e. the part of space occupied by the molding materials which combines with the inks, wherein the inks are coated to the molding materials and the space of the part of the space is the color of the inks).

Specifically, in the embodiment, the printer 1 ejects the molding materials by layers via the 3D nozzle 12, and the structure of the outer-frame portion 21 and the structure of the color portion 22 are comprised of the stacking molding materials. In addition, the printer 1 ejects the inks via the 2D nozzle 13 on the structure of the color portion 22 such that the color of the color portion 22 is different from the color of the outer-frame portion 21 (the color of the color portion 22 is the color of the inks, and the color of the outer-frame portion 21 is the color of the molding materials). Thus, the user clearly sees the pattern of the color portion 22 within the internal engraving model 2 with naked eyes which represents the internal engraving model 2 with internal engraving effect.

In an embodiment, the molding materials used by the 3D nozzle 12 is a transparent molding materials, and the printer 1 only ejects the inks on the structure of the color portion 22 and does not eject the inks on the structure of the outer-frame portion 21 during the coloring process. As a result, the pattern of the color portion 22 within the internal engraving model 2 is represented more completely and the internal engraving effect of the internal engraving model 2 is enforced.

As mentioned above, the main technical feature of the present invention is that the printed internal engraving model 2 are divided into an outer-frame portion 21 and a color portion 22, where the internal engraving effect is enhanced. In order to achieve the above mentioned effect, the printing data of the outer-frame portion 21 is obtained with the first object and the printing data of the color portion 22 is obtained with the second object, and the printing operations of the internal engraving model 2 are performed according to the two data simultaneously in the printing method of the present invention.

Figure 3:
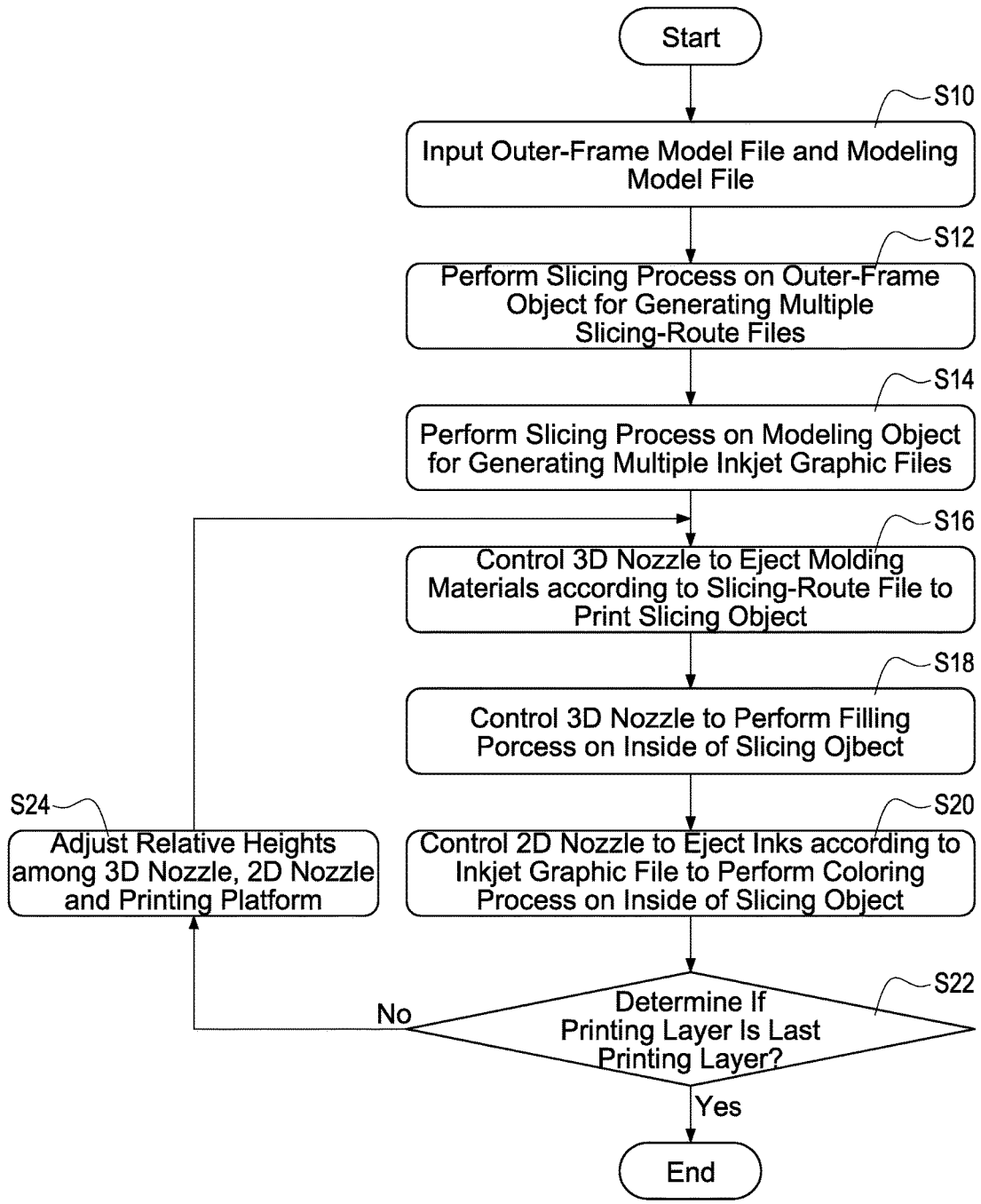
FIG. 3 is a printing flowchart according to the first embodiment of the present invention.

FIG. 3 is a printing flowchart according to the first embodiment of the present invention. The specific steps of the printing method according to the present invention are disclosed in FIG. 3. In an embodiment, the steps shown in FIG. 3 are executed by a printer 1. Specifically, the printer 1 has an application (not shown in the diagrams), the application records the computer executable codes, and the printer 1 executes each step shown in FIG. 3 after the application is executed by the printer 1.

In another embodiment, each step shown in FIG. 3 can be partially executed by the printer 1, and partially executed by a computer device (not shown in the diagrams) connected to the printer 1. Specifically, the computer device has a first application; the printer 1 has a second application. The two applications respectively record the computer executable codes. When the first application is executed by the computer device, the computer device executes each step associated with the slicing process shown in FIG. 3. When the second application is executed by the printer 1, the printer 1 executes each step associated with the printing operations. To better elaborate on the process, the description below details the associated steps with a slicing process executed by a computer device and with printing operations executed by a printer 1.

As shown in FIG. 3, the computer device first respectively input an outer-frame model file and an modeling model file 90 (step S10), wherein the outer-frame model file records an outer-frame object and the modeling model file records a modeling object, and the modeling object is required to offer color data where the printer 1 prints the above mentioned color portion 22 according to the color data. The objects above refer to virtual 3D objects which are accessed and read by the computer device.

Specifically, in the embodiment of the present invention, the profile of the modeling object is expressed via an inkjet process within the outer-frame object in order to deliver the visual effect where the outer-frame object accommodates the modeling object. Therefore, in the embodiment of the present invention, the dimension of the outer-frame object is required to be larger than the dimension of the modeling object, and the location of the modeling object is required to be set up within the outer-frame object and accommodated by the outer-frame object.

After the computer device inputs the outer-frame model file and the modeling model file, the computer device then performs a slicing process on the outer-frame object for generating multiple slicing-route files corresponding to multiple printing layers (step S12). Also, the computer device performs the slicing process on the modeling object for generating multiple inkjet graphic files corresponding to the multiple printing layers (step S14). In the following printing steps, the printer 1 prints the structure of the multiple printing layers according to the multiple slicing-route files, and prints the color of the multiple printing layers according to the multiple inkjet graphic files. In the embodiment, the above mentioned step S12 and step S14 are not executed by a fixed sequence. The computer device may execute step S12 first or executes step S14 first, but the scope is not limited thereto.

In an embodiment, the computer device executes a first slicing process on an outer-frame object in order to generate the multiple slicing-route files of the outer-frame object, but does not generate the inkjet graphic files of the outer-frame object. Also, the computer device executes a second slicing process on a modeling object, which is different from the first slicing process object, in order to generate the multiple inkjet graphic files of the modeling object, but does not generate the slicing-route files of the modeling object.

In another embodiment, the computer device executes the same slicing process on the outer-frame object and the modeling object in order to generate the multiple slicing-route files of the outer-frame object and the modeling object and generate the multiple inkjet graphic files of the outer-frame object and the modeling object. In addition, the multiple inkjet graphic files of the outer-frame object and the multiple slicing-route files of the modeling object are discarded after the slicing process is completed.

After the above mentioned slicing process is completed (i.e. step S12 to step S14), the computer device transfers the multiple slicing-route files and the multiple inkjet graphic files to the printer 1 and the printer 1 continues to perform the following printing operations.

It should be note that the multiple slicing-route files and the multiple inkjet graphic files respectively record layer numbers of the corresponding printing layers. In an embodiment, the quantity of the above mentioned printing layers (for example 1,000 layers) is based on the quantity of the printing layers generated after performing a slicing process on an outer-frame object. In an embodiment, the quantity of the above mentioned printing layers can also be based on the quantity of the printing layers generated after performing a slicing process on a modeling object, but the scope is not limited thereto.

As shown in FIG. 2, the internal engraving model generated by the printing method of the present invention represents the internal engraving effect with the color portion 22 accommodated by the outer-frame portion 21. As a result, the dimension of the outer-frame object is larger than the dimension of the modeling object. In the embodiment, the quantity of the multiple slicing-route files generated by the outer-frame object is possibly larger than the quantity of the multiple inkjet graphic files generated by the modeling object (for example 1,000 slicing-route files and 600 inkjet graphic files are generated).

In an embodiment, the computer device determines which of the inkjet graphic files corresponding to which printing layers according to the location of the color portion 22 in the outer-frame portion 21 (calculated by the computer device or manually set up by the user). For example, 1,000 slicing-route files respectively correspond to the layer 1 to the layer 1,000 and the layer numbers from "1" to "1,000" are respectively recorded; and 600 inkjet graphic files respectively correspond to the layer 201 to the layer 800 and the layer numbers from "201" to "800" are respectively recorded. Consequently, when the printer 1 prints from the layer 1 to the layer 200 and from the layer 801 to the layer 1,000, the printer 1 does not control the 2D nozzle 13 to perform the coloring process (because these layers do not have corresponding inkjet graphic files).

In the method of the present invention, when the printer 1 performs printing, the printer 1 enters into an internal engraving mode and obtains the slicing-route file of one of the multiple printing layers, and controls the 3D nozzle 12 to eject the molding materials on the printing platform 11 according to the slicing-route file in order to print the slicing object corresponding to the printing layer on the printing platform 11 (step S16). In an embodiment, the printer 1 sequentially obtains the slicing-route file of the layer 1, the slicing-route file of the layer 2 . . . in order to sequentially print the slicing object corresponding to the layer 1, the slicing object corresponding to the layer 2, and so on. Printing of the layer 1 is used as an example in the following description.

After step S16, the printer 1 then controls the 3D nozzle 12 to continue to eject the molding materials in the printed slicing object in order to perform a filling process on the inside of the slicing object (step S18).

Specifically, the 3D model is a 3D enclosed sphere. During printing, the user can set up the filling ratio in the printing configuration parameters to determine the internal filling status of the 3D model (for example if the filling ratio is 100%, then the 3D model is a solid object; if the filling ratio is 0%, then the 3D model is a hallow object).

If the user sets up a filling ratio lower than 100%, then the inside of the outer-frame object is not completely filled by the molding materials. Accordingly, the printer 1 may only eject the inks and does not eject the molding materials on the color portion 22 during the process. Given the above mentioned filling ratio is lower than 100%, and the location within the outer-frame object corresponding to the color portion 22 does not have the molding materials, the inks are unable to coat to the correct location. Therefore, the printer 1 may further determine if the printer 1 performs a filling process on the inside of the slicing object after the slicing object of a printing layer is printed. Specifically, the printer 1 determines the printer 1 performs the above mentioned filling process when the filling ratio is less than 100% and the corresponding location of the modeling object does not have the molding materials.

Specifically, in an embodiment, the printer 1 only prints the molding materials on the location within the outer-frame object corresponding to the color portion 22 (i.e. the location corresponding to the modeling object) so as to assure the ejected inks are coated to the molding material. Therefore, when the printer 1 performs the above mentioned filling process, the printer 1 may only perform filling at the location of the modeling object or the location surrounding the modeling object and is not required to fill the whole space within the outer-frame object (i.e., the filling ratio of the filling process can be 100%, or higher than a predetermined ratio and lower than 100%). Consequently, the molding material quantity used is effectively reduced without compromising the representation of the color portion 22.

However, if the imported outer-frame object is a solid 3D object (for example the user sets up the above mentioned filling ratio as 100%), or the imported outer-frame object is a 3D object which does not require to perform a filling process (for example the above mentioned filling ratio is lower than 100%, but the corresponding locations of the modeling object all have the molding material), the printer 1 does not perform step S18.

In an embodiment, if the filling ratio of the above mentioned filling process is 100% to assure each location within the slicing object has the molding materials (i.e. each location is able to be coated with the ink) in order to increase the quality of the internal engraving model 2. In another embodiment, the above mentioned filling ratio is higher than a predetermined ratio (for example 80%) and lower than 100%. As long as the coating ability of the ink on the color portion 22 is not compromised, the inside of the slicing object may not be not completely filled up by the printer 1. Thus, the molding material quantity used is effectively reduced without compromising the quality of the internal engraving model 2.

After step S18, the printer 1 then obtains the inkjet graphic file of the same printing layer (for example the layer 1), and controls the 2D nozzle 13 to eject the inks on the corresponding location of the printed (and filled) slicing object according to the inkjet graphic file in order to perform the coloring process on the inside of the slicing object (step S20).

In an embodiment, the printer 1 is disposed with a single ink cartridge, and performs a monochrome coloring process on the slicing object with the 2D nozzle 13. In another embodiment, the printer 1 is disposed with at least four ink cartridges, and ejects a cyan ink, a magenta ink, a yellow ink and a black ink in order to perform the full color coloring process with controlling the 2D nozzle 13.

It should be note that the printer 1 controls the 2D nozzle 13 to perform a parallel movement (i.e. the Y-axis coordinate is fixed and moves along the X-axis) in order to complete the coloring operations of one row (or known as one swath) when the printer 1 performs the coloring process. In addition, the printer 1 completes the coloring process of a slicing object via the coloring operations of multiple rows (i.e. multiple swaths, wherein the Y-axis coordinate of each swath is different). In order to assure the printer 1 correctly controls the movement of the 2D nozzle 13 and aligns with the 3D nozzle 12, the computer device further generates multiple inkjet-route files corresponding to the multiple printing layers for the modeling object during the above mentioned slicing process. When the printer 1 executes the coloring process, the printer 1 controls the 2D nozzle 13 to move on the printing platform 11 via the multiple inkjet-route files so as to complete the coloring operations of each row (detailed in the following).

After step S20, the printer 1 determines if the printing layer is the last printing layer of the multiple printing layers (step S22). Specifically, if the generated multiple printing layers of the outer-frame object are used as a basis in the slicing process, the printer 1 determines if the printing layer is the last printing layer of the outer-frame object; if the generated multiple printing layers of the modeling object are used as a basis in the slicing process, the printer 1 determines if the printing layer is the last printing layer of the modeling object.

If the printing layer is the last printing layer, the internal engraving model 2 is completely printed meaning that the printer 1 has finished the printing operations.

If the printing layer is not the last printing layer, the printer 1 adjusts the relative heights among the 3D nozzle, the 2D nozzle and the printing platform (step S24) so as to assure that the 3D nozzle 12 and the 2D nozzle 13 are located below printing height of the next printing layer (for example the layer 2). In addition, the printer 1 re-executes the steps from step S16 to step S20 to continue to print the slicing object corresponding to the next printing layer until all printing layers are printed.

Figure 4:
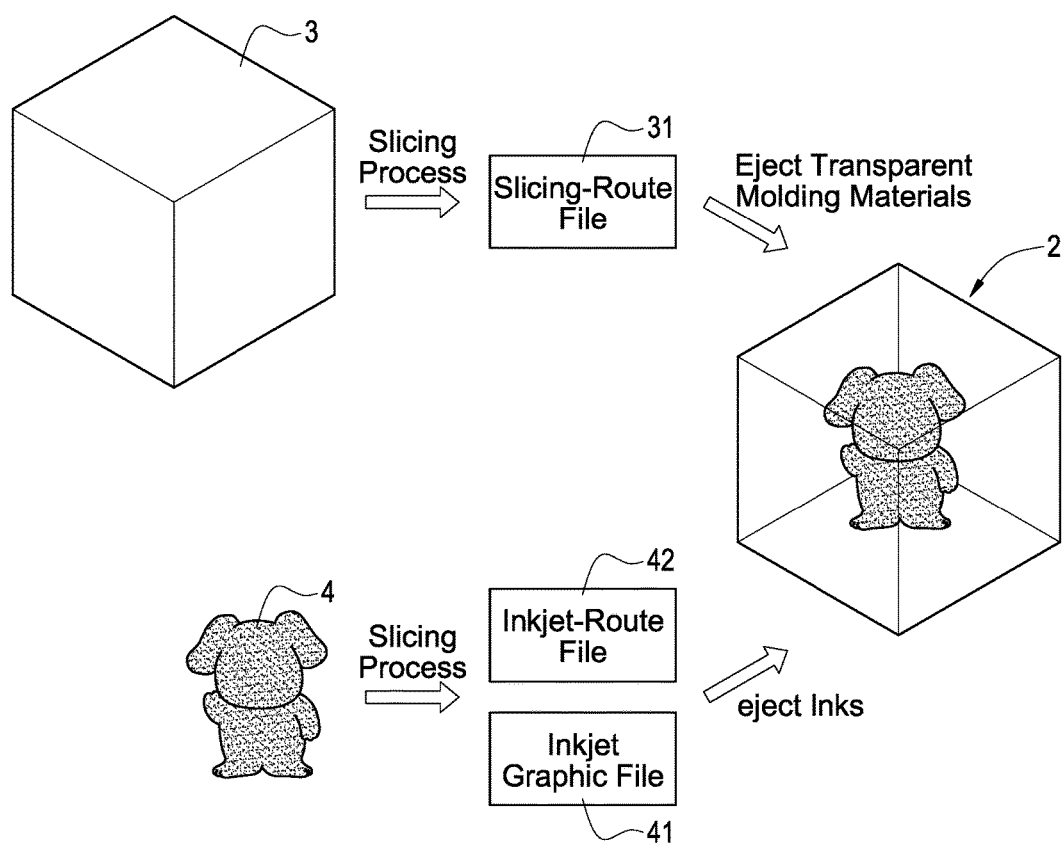
FIG. 4 is an exploded perspective view of printing operations according to the first embodiment of the present invention.

FIG. 4 is an exploded perspective view of printing operations according to the first embodiment of the present invention. In the embodiment of the method according to the present invention, the computer device or the printer 1 imports the outer-frame object 3 and performs a slicing process on an outer-frame object 3 for generating multiple slicing-route files 31 of the multiple printing layers. Among which, each slicing-route file 31 respectively corresponds to a printing layer with a layer number recorded. In the embodiment, the outer-frame object is a square object. In another embodiment, the outer-frame object 3 can be a circular object, a triangle, polygonal object or geometric objects, but the scope is not limited thereto.

When the printer 1 performs the printing operations, the printer 1 controls the 3D nozzle 12 to sequentially print the slicing object corresponding to each printing layer according to the multiple slicing-route files 31, and stacks the multiple slicing objects to form the structure of the internal engraving model 2.

Alternatively, in the embodiment of the method according to the present invention, the computer device or the printer 1 imports the modeling object 4 and performs the slicing process on the modeling object 4 for generating the multiple inkjet graphic files 41. Among which, each inkjet graphic file 41 respectively corresponds to a printing layer with a layer number recorded.

As mentioned above, the computer device or the printer 1 further generates multiple inkjet-route files 42 for the modeling object during performing the slicing process on the modeling object 4, wherein the quantity of the multiple inkjet-route files 42 equals to the quantity of the multiple inkjet graphic files 41. In addition, each inkjet-route file 42 respectively corresponds to a printing layer with a layer number recorded.

When the printer 1 performs the printing operations, the printer 1 controls the 2D nozzle 13 to perform a parallel movement and eject the inks according to the multiple inkjet graphic files during the movement in order to sequentially perform the coloring process on the inside of the slicing object of each printing layer to form the color of the inside of the internal engraving model 2.

Specifically, the multiple inkjet-route files 42 record movement start points and movement end points of the parallel movements performed on the printing platform 11 by the 2D nozzle 13. For example, coordinates of the movement start point are (0, 10) and coordinates of the movement end point are (100, 10). The printer 1 is instructed how to controls the 2D nozzle 13 to perform parallel movements via the multiple inkjet-route files 42.

In an embodiment, the printer 1 controls the 2D nozzle 13 to perform several parallel movements (i.e., several swaths) to complete the coloring process of a slicing object. In the embodiment, the multiple inkjet-route files 42 respectively record movement start points and movement end points of the parallel movements by the 2D nozzle 13, wherein the Y-axis coordinate of each parallel movement is different. For example, a coloring process is completed by three parallel movements, wherein the coordinates of the movement start point of the first parallel movement (the first swath) are (0,0) and the coordinates of the movement end point are (100,10); the coordinates of the movement start point of the second parallel movement (the second swath) are (0,20) and the coordinates of the movement end point are (100,20); and the coordinates of the movement start point of the third parallel movement (the third swath) are (0,30) and the coordinates of the movement end point are (100,30).

As mentioned above, the printer 1 controls the movement of the 3D nozzle 12 according to the multiple slicing-route files 31 and controls the movement of the 2D nozzle 13 according to the multiple inkjet-route files 42. In an embodiment, the printer 1 respectively obtains multiple slicing-route files 31 and multiple inkjet-route files 42 in order to respectively perform movement control of a 3D nozzle 12 and a 2D nozzle 13. Among which, the multiple slicing-route files 31 and the multiple inkjet-route files 42 are g code files, but the scope is not limited thereto.

In another embodiment, a printer 1 or a computer device combines multiple slicing-route files 31 and multiple inkjet-route files into multiple nozzle control-route files in advance (not shown in the diagrams). When the printer 1 performs the printing operations, the printer 1 only obtains the multiple nozzle control-route files, controls the movement of the 3D nozzle 12 according to the 3D nozzle control data in the nozzle control-route files, and controls the movement of the 2D nozzle 13 according to the 2D nozzle control data in the nozzle control-route files. Consequently, the above method effectively reduces the required capacity of a cache or a memory in the printer 1.

A first printing operation schematic diagram to a sixth printing operation schematic diagram according to the first embodiment of the present invention illustrated in FIG. 5A-5F.

Figure 5A:
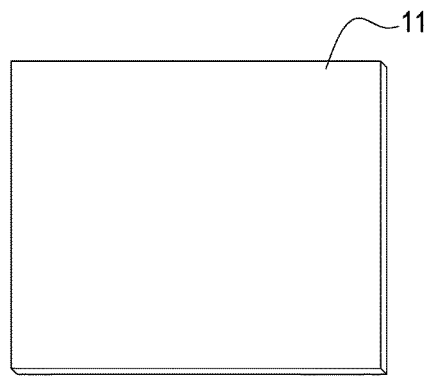
FIG. 5A is a first printing operation schematic diagram according to the first embodiment of the present invention.

As shown in FIG. 5A, the printer 1 respectively controls the 3D nozzle 12 and the 2D nozzle 13 in order to print the slicing objects of each printing layer on the printing platform 11 and further stacks the multiple slicing objects to form the internal engraving model 2.

Figure 5B:
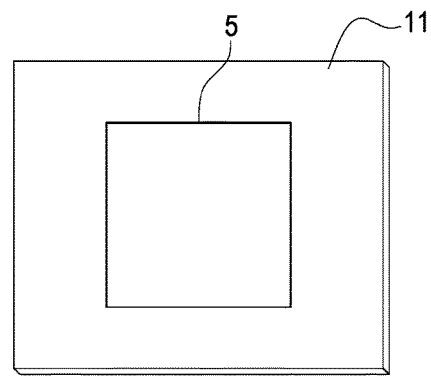
FIG. 5B is a second printing operation schematic diagram according to the first embodiment of the present invention.

As shown in FIG. 5B, the printer 1 first obtains the slicing-route file 31 of a printing layer (for example the layer 1) in order to control the 3d nozzle 12 to print the slicing object 5 of the layer 1. In the embodiment shown in FIG. 5B, the slicing object 5 has the filling ratio which is lower than the 100% and requires the filling process, but the scope is not limited thereto.

Figure 5C:
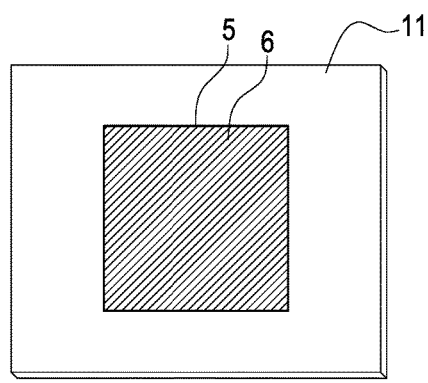
FIG. 5C is a third printing operation schematic diagram according to the first embodiment of the present invention.

Next, as shown in FIG. 5C, the printer 1 continues to control the 3D nozzle 12 after printing the slicing object 5 to print the filling portion 6 of the inside of the slicing object 5. Thus, all locations of the inside of the slicing object 5 corresponding to the modeling object have the molding materials.

Figure 5D:
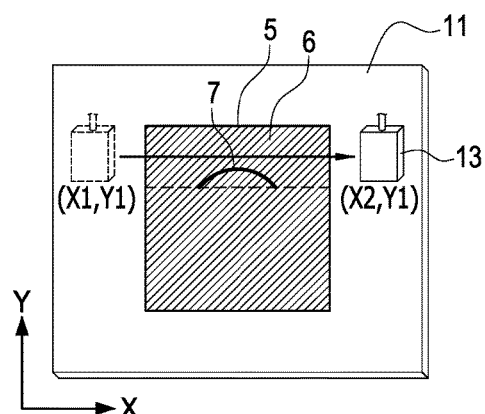
FIG. 5D is a fourth printing operation schematic diagram according to the first embodiment of the present invention.

Next, as shown in FIG. 5D, the printer 1 obtains the inkjet graphic file 41 and the inkjet-route file 42, controls the 2D nozzle 13 to perform the first parallel movement (from the movement start point (X1,Y1) to the movement end point (X2,Y1)) according to the inkjet-route file 42; and during the movement of the 2D nozzle 13, the printer 1 controls the 2D nozzle 13 to eject the inks on the corresponding locations according to the inkjet graphic file 41 in order to print the first row of the color portion 7 on the inside of the slicing object 5.

Figure 5E:
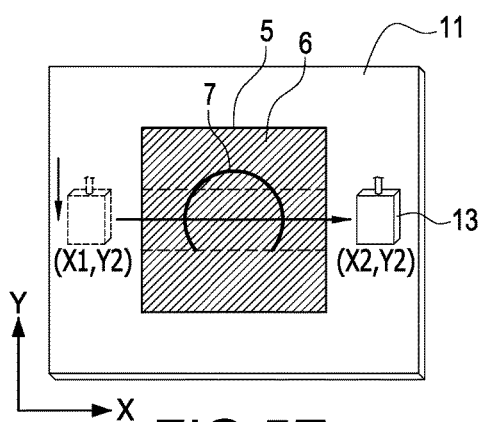
FIG. 5E is a fifth printing operation schematic diagram according to the first embodiment of the present invention.

Next, as shown in FIG. 5E, the 2D nozzle 13 completes the first parallel movement, the printer 1 controls the 2D nozzle 13 to perform a second parallel movement (from the movement start point (X1,Y2) to the movement end point (X2,Y2)) according to the inkjet-route file 42. In addition, during the movement of the 2D nozzle 13, the printer 1 controls the 2D nozzle 13 to eject the inks on the corresponding locations according to the inkjet graphic file 41 in order to print the second row of the color portion 7 on the inside of the slicing object 5.

Figure 5F:
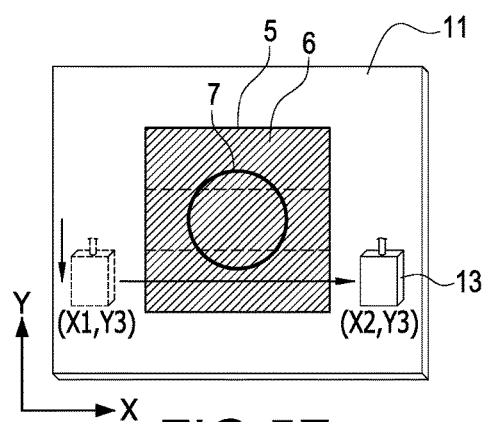
FIG. 5F is a sixth printing operation schematic diagram according to the first embodiment of the present invention.

Lastly, as shown in FIG. 5F, the 2D nozzle 13 completes the second parallel movement, the printer 1 controls the 2D nozzle 13 to perform a third parallel movement (from the movement start point (X1,Y3) to the movement end point (X2,Y3)) according to the inkjet-route file 42. In addition, during the movement of the 2D nozzle 13, the printer 1 controls the 2D nozzle 13 to eject the inks on the corresponding locations according to the inkjet graphic file 41 in order to print the third row of the color portion 7 on the inside of the slicing object 5.

When the above mentioned color portion 7 is completely printed, the printer 1 determines that the slicing object of the layer 1 is completed. Next, the printer 1 obtains the slicing-route file 31, the inkjet graphic file 41 and the inkjet-route file 42 of the next printing layer (for example the layer 2), and repeat the printing operations shown from FIG. 5B to FIG. 5F until all printing layers are printed.

As mentioned above, the method according to the present invention simultaneously uses two data of two objects (such as the above mentioned outer-frame object 3 and the modeling object 4) to print a physical 3D model. In other words, the method according to the present invention requires obtaining data of at least two different objects.

Figure 6A:
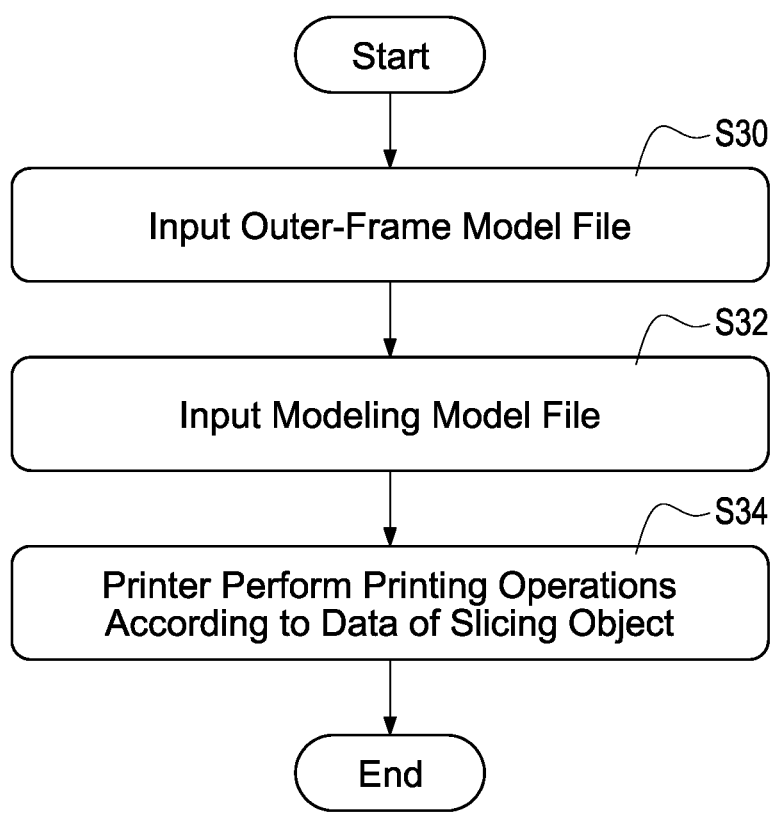
FIG. 6A is a printing flowchart according to a second embodiment of the present invention.

FIG. 6A is a printing flowchart according to a second embodiment of the present invention. In the embodiment, a user inputs an outer-frame model file to a computer device (step S30) and inputs a modeling model file to the computer device (step S32). The computer device obtains an outer-frame object 3 and a modeling object 4 and performs a slicing process on the outer-frame object 3 and modeling object 4. Next, the printer 1 performs printing according to the slicing data (step S34).

In the embodiment in FIG. 6A, the user draws the outer-frame object 3 and the modeling object 4 with a 3D modeling application to save the outer-frame object 3 as an outer-frame model file, and save the modeling object 4 as a modeling model file. Or, the user obtains an outer-frame model file and a modeling model file via a network or a portable storage device which are drawn and saved in advance.

Figure 6B:
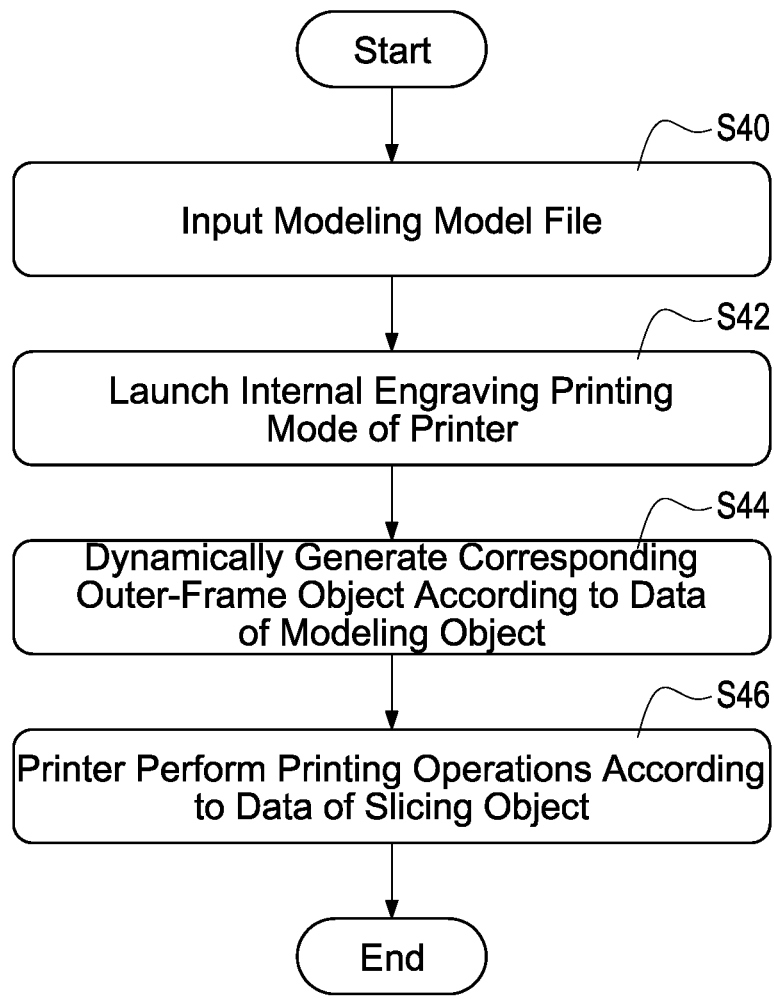
FIG. 6B is a printing flowchart according to a third embodiment of the present invention.

FIG. 6B is a printing flowchart according to a third embodiment of the present invention. In the embodiment, a user inputs a modeling model file to a computer device (step S40) and launches an internal engraving mode of the printer 1 (step S42). After the internal engraving mode is launched, the computer device determines that the user demands to generate an internal engraving model 2 with the modeling object 4 recorded in the modeling model file. Therefore, the computer device dynamically generates a corresponding outer-frame object 3 according to the data of the modeling object 4 (step S44).

In an embodiment, the computer device automatically generates a corresponding outer-frame object 3 according to the dimension of the modeling object 4, and makes the dimension of the outer-frame object 3 larger than the dimension of the modeling object 4 (i.e. The outer-frame object 3 accommodates the modeling object 4). Furthermore, in another embodiment, the computer device pre-determines the outer-frame objects 3 of several geometric shapes, for example a circular object, a triangle object, a square object for users references. Also, after the user selects an outer-frame object 3 of any geometric shapes, the computer device automatically adjusts the dimension of the selected outer-frame object 3 according to the dimension of the modeling object 4, and makes the dimension of the outer-frame object 3 larger than the dimension of the modeling object 4 accommodating the modeling object 4.

After step S44, the computer device performs a slicing process on the outer-frame object 3 and modeling object 4, and the printer 1 performs printing of the internal engraving model 2 (step S46).

In the embodiment in FIG. 6A, the user draws the modeling object 4 and saves the modeling object 4 as a modeling model file with a 3D modeling application, and the outer-frame object 3 is automatically generated by the computer device or the printer 1. Thus, the user is allowed to use one 3D file to directly generate an internal engraving model 2 which offers an easily operated method.

Figure 7:
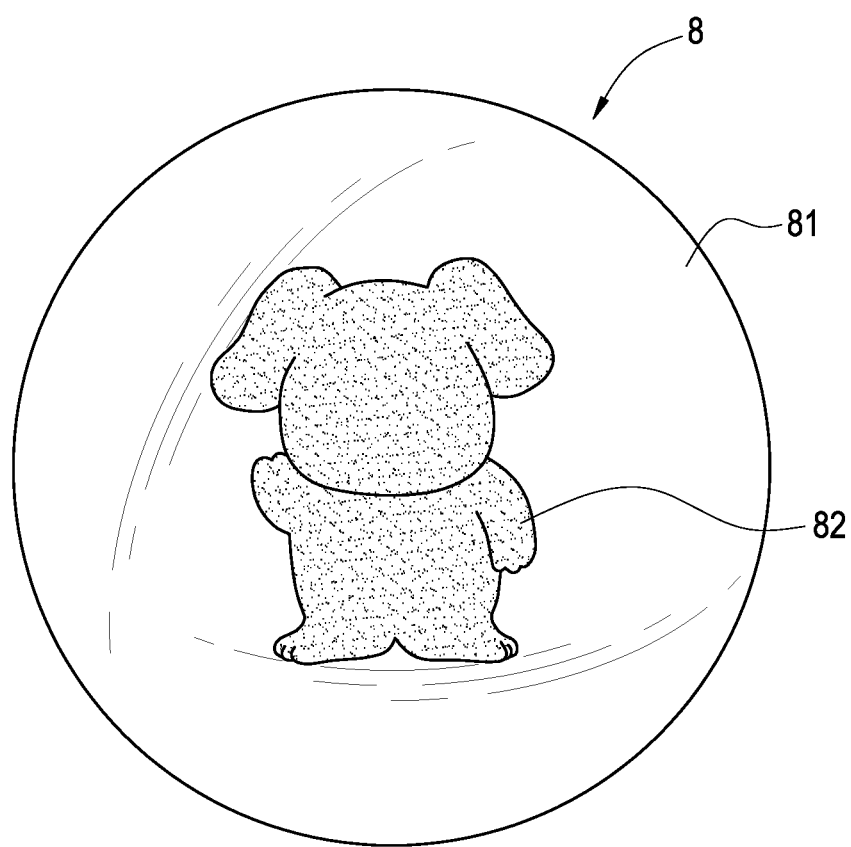
FIG. 7 is a schematic diagram of an internal engraving model according to the second embodiment of the present invention.

FIG. 7 is an internal engraving model schematic diagram according to the first embodiment of the present invention. Another internal engraving model is shown in the embodiment in FIG. 7, the internal engraving model 8 is identical with the above mentioned internal engraving model 2 and both internal engraving models have the outer-frame portion 81 and the color portion 82.

In the above mentioned embodiment, the internal engraving model 2 is made based on the square outer-frame object 3 and accordingly the shape of the outer-frame portion 21 is square. In the embodiment shown in FIG. 7, the internal engraving model 8 is made based on the circular outer-frame object 8 and accordingly the shape of the outer-frame portion 81 is circular.

The above mentioned internal engraving models 2 and 8 are embodiments according to the present invention but the scope is not limited thereto. With the printing method disclosed in the present invention, a user may combine outer-frame objects of any shapes with modeling objects of any patterns according to actual demands which is output to the printer 1 to perform the printing operations in order to print 3D models with special effects.

As the skilled person will appreciate, various changes and modifications can be made to the described embodiment. It is intended to include all such variations, modifications and equivalents which fall within the scope of the present invention, as defined in the accompanying claims.

What is claimed is:

1. A method for printing a model used for a 3D printer including a printing platform, a 3D nozzle and a 2D nozzle, comprising:
   a) performing a slicing process on an outer-frame object for generating multiple slicing-route files of multiple printing layers;
   b) performing the slicing process on a modeling object for generating multiple inkjet graphic files of the multiple printing layers, wherein the modeling object is different from the outer-frame object and the dimension of the outer-frame object is larger than the dimension of the modeling object in more than one direction;
   c) controlling the 3D nozzle to eject a molding material on the printing platform according to the slicing-route file of one of the multiple printing layers in order to print a slicing object corresponding to the printing layer;
   d) controlling the 2D nozzle to eject inks on the corresponding location of the slicing object according to the inkjet graphic file of the same printing layer in order to perform a coloring process on the inside of the printed slicing object;
   e) determining if the printing layer is a last printing layer of the multiple printing layers; and
   f) if the printing layer is not the last printing layer of the multiple printing layers, adjusting relative heights among the 3D nozzle, the 2D nozzle and the printing platform and re-executing from the step c to the step e in order to print the next printing layer.

2. The method for printing a model for a 3D printer of claim 1, wherein the molding material is a transparent or a semi-transparent molding material.

3. The method for printing a model for a 3D printer of claim 1, further comprising a step g): if a filling ratio of the slicing object is lower than 100% and the corresponding location of a modeling object does not have the molding material after step c), controlling the 3D nozzle to eject the molding material within the slicing object in order to perform a filling process on the slicing object.

4. The method for printing a model for a 3D printer of claim 3, wherein the filling ratio of the filling process is 100%.

5. The method for printing a model for a 3D printer of claim 3, wherein the filling ratio of the filling process is higher than a predetermined ratio and lower than 100%.

6. The method for printing a model for a 3D printer of claim 1, wherein the step a) further comprises a step a01): inputting an outer-frame model file and a modeling model file, wherein the outer-frame model file records the outer-frame object and the modeling model file records the modeling object.

7. The method for printing a model for a 3D printer of claim 1, wherein the step a) further comprises the following steps:
   a01) inputting a modeling model file, wherein the modeling model file records the modeling object;
   a02) launching an internal engraving mode of the 3D printer; and
   a03) dynamically generating the corresponding outer-frame object according to data of the modeling object after step a02).

8. The method for printing a model for a 3D printer of claim 1, wherein the outer-frame object is a square object or a circular object.

9. The method for printing a model for a 3D printer of claim 1, wherein the slicing process in step b) simultaneously generates multiple inkjet-route files of the multiple printing layers, wherein each of the inkjet-route files respectively records a movement start point and a movement end point of a parallel movement performed on the printing platform by the 2D nozzle.

10. The method for printing a model for a 3D printer of claim 9, wherein the step d) is controlling the 2D nozzle to perform several parallel movements in order to complete the coloring process, wherein each of the inkjet-route files respectively records movement start points and movement end points of the several parallel movements.

11. The method for printing a model for a 3D printer of claim 9, further comprising a step h): combining the multiple slicing-route files and the multiple inkjet-route files into multiple nozzle control-route files, wherein step c) is controlling the 3D nozzle to move according to the nozzle control-route file of the printing layer and step d) is controlling the 2D nozzle to move according to the nozzle control-route file of the printing layer.

12. The method for printing a model for a 3D printer of claim 9, wherein the multiple slicing-route files and the multiple inkjet-route files are G-code files.

13. The method for printing a model for a 3D printer of claim 1, wherein the step d) is controlling the 2D nozzle to eject at least one of a cyan ink, a magenta ink, a yellow ink and a black ink in order to perform the full color coloring process.

* * * * *